United States Patent [19]

Malanga et al.

[11] Patent Number: 4,950,724

[45] Date of Patent: Aug. 21, 1990

[54] SUSPENSION POLYMERIZATION OF VINYL AROMATIC MONOMERS TO POLYMER HAVING HIGH SYNDIOTACTICITY

[75] Inventors: Michael T. Malanga; Thomas H. Newman, both of Midland, Mich.

[73] Assignee: The Dow Chemical Company, Midland, Mich.

[21] Appl. No.: 249,752

[22] Filed: Sep. 27, 1988

[51] Int. Cl.$^5$ .......................... C08F 2/14; C08F 12/08
[52] U.S. Cl. ...................... 526/144; 526/74; 526/160; 526/346; 526/347.2
[58] Field of Search ................. 526/144, 346, 347.2, 526/74, 160

[56] References Cited

U.S. PATENT DOCUMENTS 3,050,510  8/1962  Canterino et al. .................. 526/144
4,774,301  9/1988  Campbell, Jr. et al. ...... 526/347.2 X

FOREIGN PATENT DOCUMENTS 0210615  2/1987  European Pat. Off. ......... 526/347.2

OTHER PUBLICATIONS

Gaylord et al., Linear and Stereoregular Addition Polymers: Polymerization with Controlled Propagation, Interscience, N.Y., 91 (1959).

*Primary Examiner*—Joseph L. Schofer
*Assistant Examiner*—F. M. Teskin

[57] ABSTRACT

Vinyl aromatic polymers having stereo regular structure of high syndiotacticity are prepared utilizing coordination catalysts in a suspension polymerization process.

8 Claims, No Drawings

SUSPENSION POLYMERIZATION OF VINYL AROMATIC MONOMERS TO POLYMER HAVING HIGH SYNDIOTACTICITY

BACKGROUND OF THE INVENTION

The present invention relates to a suspension polymerization process suitable for preparing coordination catalyzed polymers of vinyl aromatic monomers. More particularly the present invention relates to a process suitable for the preparation of vinyl aromatic polymers having stereoregular structure of high syndiotacticity.

In U.S. Pat. No. 4,680,353 there is disclosed a process for the preparation of polymers of vinyl aromatic monomers having stereo regular structure of high syndiotacticity by the use of coordination catalysts, particularly certain transition metal catalysts. The process disclosed in the foregoing U.S. patent is a solution polymerization wherein the vinyl aromatic monomer is initially dissolved in a suitable inert liquid solvent and the so dissolved monomer thereafter contacted under polymerization conditions with the appropriate coordination catalyst. The resulting polymer possesses a highly crystalline nature and consequently becomes insoluble in the reaction mixture. However, at the same time the polymeric product is highly swollen by the solvent and readily forms an intractable gel-like structure preventing the necessary homogenization of the reaction mixture. As a result the reactor is rather quickly fouled with this polymer gel. Because of this reason catalyst efficiencies in the solution polymerization process disclosed in the foregoing U.S. patent have been found to be relatively low, while at the same time heat removal and product recovery are particularly difficult. It is therefor understandable that scaling the reaction disclosed in the foregoing U.S. patent to commercial sized reactors has proven problematic and impractical.

It is previously known in the art to prepare atactic polystyrene by means of a suspension process. However, the suspension polymerization of atactic polystyrene has previously employed a free radical catalyst and the suspending medium has been principally water or similar nonsolvent liquid. Disadvantageously, however, typical coordination catalysts are highly reactive with water or other polar, protic solvents. Accordingly it is not possible to prepare vinyl aromatic polymers utilizing coordination catalysts according to previously known suspension processes.

It would be desirable if there were provided a suitable suspension process for the preparation of coordination catalyzed vinyl aromatic polymers. More particularly it would be desirable to provide a suspension process wherein the coordination catalyzed polymerization of vinyl aromatic monomers may be conducted in high efficiency and convenience and in volumes sufficient for commercial purposes.

SUMMARY OF THE INVENTION

Accordingly, there is now provided a process for the coordination catalyzed polymerization of vinyl aromatic monomers comprising forming a suspension of a vinyl aromatic monomer and an inert liquid that is a nonsolvent for the monomer and the resulting polymer; contacting the suspended monomer with a coordination catalyst under polymerization conditions so as to form a vinyl aromatic polymer having stereo regular structure of high syndiotacticity: and recovering the resulting polymer.

DETAILED DESCRIPTION OF THE INVENTION

Suitable inert liquid nonsolvents for use according to the present suspension polymerization process are those compounds having a solubility parameter of 4 to 7 and which are nonreactive with the coordination catalyst. Examples primarily include the fluorinated aliphatic organic compounds. Suitably the fluorinated compounds include only fluorine, carbon, hydrogen or other halogens. Highly preferred inert liquid nonsolvents include the fluorinated and the fluorochlorinated aliphatic and aromatic organic compounds. Most highly preferred inert liquid nonsolvents are perfluorinated aliphatic compounds and mixtures thereof. Examples include perfluoromethylcyclohexane, perfluorohexane, perfluorooctane, and perfluorodecalin.

Suitable vinyl aromatic monomers for use in preparing vinyl aromatic polymers having stereoregular structure of high syndiotacticity are those previously known in the art and disclosed for example in U.S. Pat. No. 4,680,353. The preferred vinyl aromatic monomer is styrene.

Suitably the coordination catalyst employed in the present process is the combination of a metallocene complex of a transition metal and an aluminoxane. Preferred coordination catalysts are the metallocene complexes of titanium in combination with polymethylalumoxane. Most preferred coordination catalysts are monocyclopentadienyl titanium trialkoxides having from 1 to 6,carbons in the alkyl group in combination with polymethylaluminoxane. Optionally an aluminum alkyl compound, particularly triisobutyl aluminum, is also added to the catalyst mixture.

In the operation of the process the monomer or combination of monomers are added to the inert liquid nonsolvent and suitably dispersed as by stirring, mixing, agitation or other method. The coordination catalyst is suitably added and also dispersed into finely divided particles. Alternatively the catalyst and styrene may be combined and retained at reduced temperature, preferably less than 0° C., and then combined with the inert liquid nonsolvent. The mixture is raised to a suitable polymerization temperature and retained at such temperature until the desired degree of monomer conversion is attained. Preferred temperatures are from about 20° C. to about 150° C., most preferred from about 50° C. to about 75° C. The order of addition of coordination catalysts and reactants may be reversed if desired and the process may be conducted in a continuous manner as by continuously adding vinyl aromatic monomers to a well-stirred suspension containing the coordination catalyst and inert liquid nonsolvent, and continuously removing particulated polymeric product. Because the inert liquid nonsolvent is not a solvent for the monomers or coordination catalyst or resulting polymer, and further because the inert liquid nonsolvent preferably does not swell the polymeric structure of the resulting polymer, very little reactor fouling is encountered during the process and the product may be recovered as beads by utilization of filtration or other suitable recovery techniques. Volume average diameters of the beads are generally from 100 microns to 1.0 cm, preferably from 0.1 mm to 2.0 mm.

Because the coordination catalyst becomes entrained in the resulting polymeric product it is necessary to continuously add additional amounts of coordination catalyst. Suitably the catalyst and vinyl aromatic monomer are combined in a ratio so as to provide substantially complete conversion of the vinyl aromatic monomer in the desired reaction time. Suitably, on a weight basis, the catalyst and the vinyl aromatic monomer are combined in an amount from about $1\times10^{-6}:1$ to about 0.1:1.

While any suitable pressure may be employed in order to retain the inert liquid nonsolvent in a liquid state it is preferred due to cost considerations, to utilize only moderate reaction pressures. Preferred are pressures from atmospheric to about 100 atmospheres. Suitably the reaction is conducted under an inert atmosphere including nitrogen or other inert gaseous atmospheres, such as argon, helium, etc. Suitably large amounts of vinyl aromatic monomer may be combined with the inert liquid nonsolvent, it only being necessary to maintain sufficient inert liquid nonsolvent such that a suitable suspension is formed. Preferably the mixture of vinyl aromatic monomer and inert liquid nonsolvent may range on a weight basis from about 10 percent vinyl aromatic monomer to about 75 percent vinyl aromatic monomer, preferably from about 15 percent vinyl aromatic monomer to about 60 percent vinyl aromatic monomer.

In addition to the inert liquid nonsolvents, small amounts of inert solvents may be present in the reaction mixture provided that the same do not adversely affect the desired reaction conditions. For example toluene, ethylbenzene, and other inert solvents for the vinyl aromatic monomer may be present. These solvents may be incidentally employed in the preparation of the coordination catalyst or otherwise, introduced into the reaction mixture. Preferably no more than about 10 percent by weight of such additional inert solvents are present.

Also, it may be desirable to include suspending aids such as thickeners or surfactant-like materials in the reaction mixture provided the same do not adversely affect the polymerization process. Examples of suitable thickeners include high molecular weight fluorinated compounds such as perfluorinated kerosene (available from Hooker Chemical under the trade name Fluorolube) and polymeric or oligomeric compounds such as polymers and copolymers of pentafluorostyrene or polytetrafluoroethylene. Preferably such polymeric or oligomeric thickeners have a molecular weight from 100 to 5,000, most preferably from 500 to 3,000. Suitable surfactant-like materials include molecules having an aromatic or aliphatic functionality and a halogenated, especially fluorinated, functionality in separated areas of the molecule. Examples include 1-phenylperfluorodecane, or low molecular weight block copolymers of perfluorinated olefins, such as tetrafluoroethylene, and ethylene, an α-olefin or a diolefin.

Because the suspension process does not result in formation of gels and allows for the easy recovery of particulated polymeric product the preparation of the highly desired vinyl aromatic polymer having stereo regular structure of high syndiotacticity is greatly facilitated according to the present invention. Preferred polymers are those having syndiotacticity as measured by $^{13}C$ NMR of 50 percent or greater, most preferably 90 percent or greater.

Having described the invention the following examples are provided as further illustrative and are not to be construed as limiting.

EXAMPLE 1

In a flask under nitrogen atmosphere, 100 ml of styrene, 1.74 ml of a 1.0 molar solution of methylaluminoxane in toluene and 0.87 ml of a 1.0 molar solution of triisobutylaluminum in toluene were combined. The resulting mixture was cooled to $-5°$ C. and 0.87 ml of a 0.01 molar solution of monocyclopentadienyl titanium triphenoxide in toluene was added. The resulting solution was transferred to 200 ml of stirred perflourooctane at 50° C. After 2 hours the reaction was quenched by addition of methanol to the suspension. The product was recovered as white beads. Yield was 45%. Syndiotacticity as determined by $^{13}C$ NMR was greater than 95 percent. The melting point was 268° C.

EXAMPLE 2

In a drybox, 0.348 g of a 10 percent by weight toluene solution of methylalumoxane and 1.0 g of styrene were added to a glass vial. Then, 5 g of perfluoro(methylcyclohexane) were added. The vial was sealed with a crimped rubber septum and removed from the dry box. At room temperature, 160 $\mu l$ of 0.01 M solution of cyclopentadienyl titanium trimethoxide in toluene were added. The vial was then shaken on a mechanical shaker for 30 minutes. The reaction was quenched after this time and the solid white polystyrene beads (average particle diameter 1.0 mm) isolated by filtration. The yield was 40 percent, melting point was 273° C., and heat of fusion was 36 J/g.

EXAMPLE 3

The reaction conditions of Example 2 were substantially repeated employing 2 g of styrene monomer and 5 g of perfluoro(methylcyclohexane) as inert diluent. After reacting for 30 minutes the reaction was quenched and the solid white polystyrene recovered by filtration. The yield was 42 percent, melting point 273° C.

EXAMPLE 4

The reaction conditions of Example 1 were repeated employing perfluorohexane as the inert liquid. The resulting polymeric product was equivalent to that prepared in Example 1.

EXAMPLE 5

If the reaction conditions of Example 1 are repeated employing perfluorodecalin as the inert diluent, the resulting polymeric product would be equivalent to that prepared in Example 1.

What is claimed is:

1. A process for the coordination catalyzed polymerization of vinyl aromatic monomers comprising forming a suspension of a vinyl aromatic monomer and an inert liquid comprising a fluorinated aliphatic or aromatic organic compound that is a nonsolvent for the monomer and the resulting polymer; contacting the suspended monomer with a suitable coordination catalyst under polymerization conditions so as to form a vinyl aromatic polymer having syndiotacticity as measured by $^{13}C$ NMR of 50 percent or greater; and recovering the resulting polymer.

2. A process according to claim 1 wherein the nonsolvent has a solubility parameter of 4 to 7.

3. A process according to claim 1 wherein the inert liquid is selected from the group consisting of fluorinated and fluorochlorinated aliphatic and aromatic compounds.

4. A process according to claim 1 wherein the inert liquid is a perfluorinated aliphatic compound.

5. A process according to claim 1 wherein the inert liquid is perfluoro(methylcyclohexane), perfluorohexane, perfluorodecalin, or perfluorooctane.

6. A process according to claim 1 wherein the coordination catalyst comprises the reaction product of a metallocene complex of a transition metal and an aluminoxane.

7. A process according to claim 6 wherein the coordination catalyst comprises the reaction product of a monocyclopentadienyl titanium trialkoxide having 1 to 6 carbons in the alkyl group and polymethylaluminoxane.

8. A process according to claim 1 wherein the suspension additionally comprises a suspending aid.

* * * * *